(12) United States Patent
Yokota

(10) Patent No.: US 6,302,810 B2
(45) Date of Patent: *Oct. 16, 2001

(54) SOLID GOLF BALL

(75) Inventor: Masatoshi Yokota, Fukuchiyama (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,677

(22) Filed: Sep. 9, 1997

(30) Foreign Application Priority Data

Sep. 9, 1996 (JP) .................................................. 8-237715

(51) Int. Cl.[7] .................................................. A63B 37/06

(52) U.S. Cl. .......................... 473/377; 473/372; 473/378

(58) Field of Search .................................... 473/377, 351, 473/383, 384, 372, 378

(56) References Cited

U.S. PATENT DOCUMENTS

| 5,368,304 | * | 11/1994 | Sullivan et al. ...................... 473/377 |
| 5,497,996 | * | 3/1996 | Cadorniga ........................ 473/377 X |
| 5,516,110 | * | 5/1996 | Yabuki et al. .................... 473/377 X |
| 5,776,012 | * | 7/1998 | Moriyama et al. .............. 473/377 X |
| 5,803,834 | * | 9/1998 | Yamagishi et al. .................. 473/377 |

FOREIGN PATENT DOCUMENTS

2286594   8/1995   (GB) .

* cited by examiner

Primary Examiner—William M. Pierce
(74) Attorney, Agent, or Firm—Birch, Stewart, Kolasch & Birch, LLP

(57) ABSTRACT

The present invention provides a solid golf ball having good controllability on approach shots and good shot feel and excellent flight performance which comprises a core and a cover formed on the core, wherein the cover has a thickness of 1.0 to 2.1 mm and a JIS-C hardness of 75 to 95, the core is formed from a rubber composition comprising 100 parts by weight of cis-1,4-polybutadiene rubber and 30 to 40 parts by weight of metal salt of an unsaturated carboxylic acid, and the JIS-C hardness difference between the surface of the core and the cover is not more than 10.

4 Claims, 1 Drawing Sheet

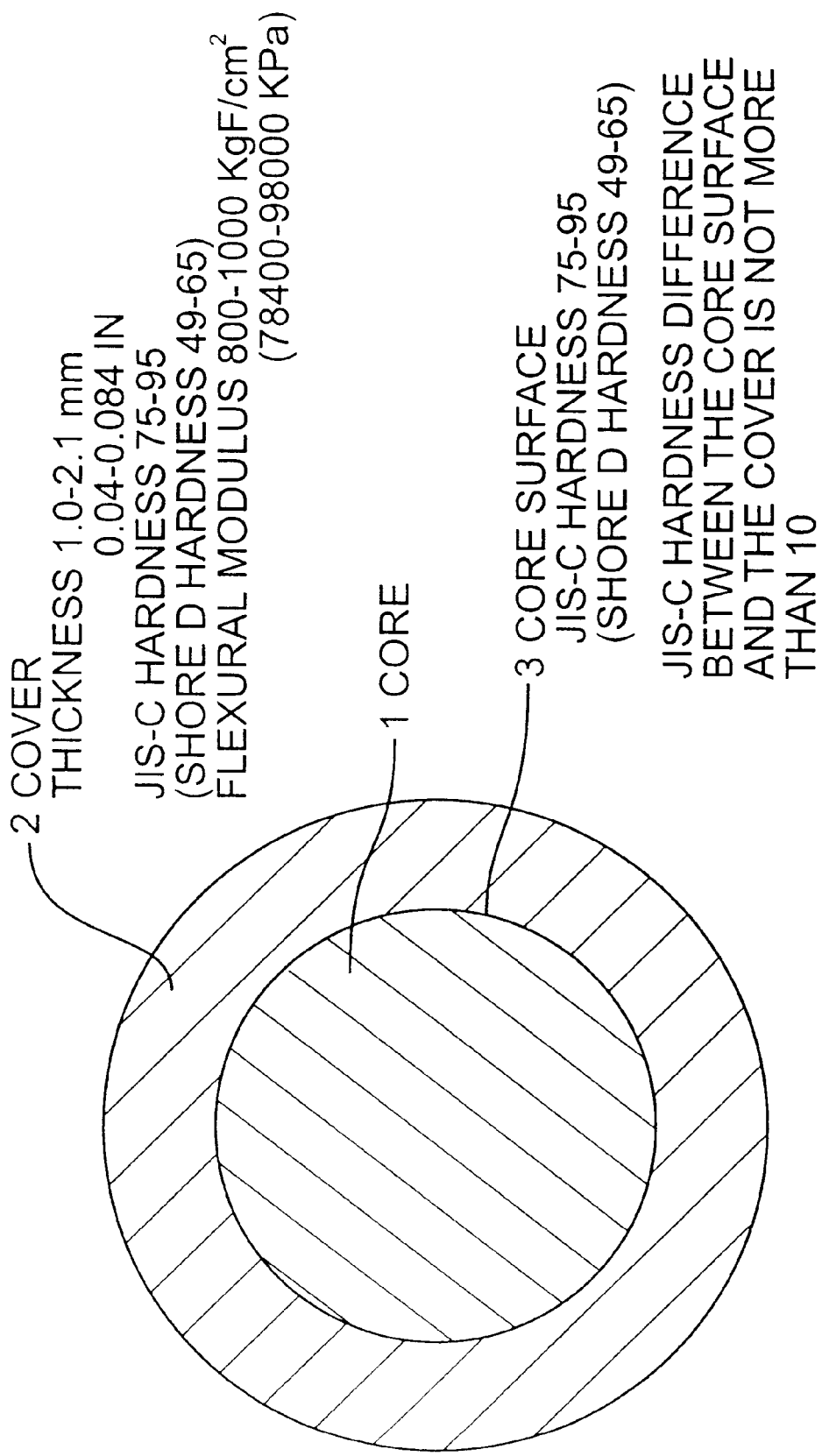

SOLID GOLF BALL

FIELD OF THE INVENTION

The present invention relates to a solid golf ball and more particularly to a solid golf ball having good controllability on approach shots, good shot feel, and excellent flight performance.

BACKGROUND OF THE INVENTION

Many golf balls are commercially selling, but they are typically classified into solid golf balls (such as, two-piece solid golf balls) and thread wound golf balls. The solid golf ball consists of a solid core of molded rubber material and a cover of thermoplastic resin (e.g. ionomer resin) covering the solid core. The thread wound golf ball consists of a solid or liquid center, a thread wound layer formed the center and a cover of ionomer resin or balata etc. having a thickness of 1 to 2 mm covering on the thread wound layer. The solid golf ball, when compared with the thread wound golf ball, has better durability and better flight performance because of a larger initial velocity when struck, and a longer flight distance. The solid golf ball is generally approved or employed by many golfers, especially amateur golfers. On the other hand, the solid golf ball exhibits a hard shot feel when hit, and shows difficulty when trying to spin the ball, thus exhibiting poor controllability at approach shot. The difficulty of putting spin on the ball comes from the structural features of the solid golf ball whereas the ball velocity is very high, when hitting, and a contact area of the ball with a hitting face of a golf club is very small. Thus, the solid golf ball is not approved of or employed by professional golfers or high level amateur golfers who attach importance to shot feel and controllability of the approach shot.

In order to improve controllability and shot feel of the solid golf ball, it has been attempted to soften the cover of the solid golf ball by various means. However, softening of the cover adversely degrades the rebound characteristics of the ball, and reduces flight distance, because the launch angle is low and the spin amount is high causing a high trajectory when hit by a driver or a long iron club.

OBJECTS OF THE INVENTION

A main object of the present invention is to provide a solid golf ball having good controllability on approach shots, good shot feel, and excellent flight performance.

According to the present invention, the object described above has been accomplished by softening the cover, by reducing the thickness of the cover to restrain the rebound characteristics from degrading, and by reducing the hardness difference between the core surface and the cover, thereby providing a solid golf ball having good controllability on approach shots and good shot feel, while maintaining the characteristics inherent in solid golf ball, i.e. excellent flight performance.

SUMMARY OF THE INVENTION

The present invention provides a solid golf ball comprising a core and a cover formed on the core, wherein the cover has a thickness of 1.0 to 2.1 mm and a JIS-C hardness of 75 to 95, and the core is formed from a rubber composition comprising 100 parts by weight of cis-1,4-polybutadiene rubber and 30 to 40 parts by weight of a metal salt of unsaturated carboxylic acid, and wherein the JIS-C hardness difference between a surface of the core and the cover is not more than 10.

BRIEF DESCRIPTION OF THE DRAWING

The present invention will become more fully understood from the detailed description given hereinbelow and the accompanying drawing which is given by way of illustration only and thus is not limitative of the present invention, and wherein:

The FIGURE illustrates the golf ball of the present invention.

DETAILED DESCRIPTION OF THE INVENTION

In the solid golf ball of the present invention, a cover 2 is provided on a core 1. The core is obtained by vulcanizing or press-molding a rubber composition. The rubber composition typically comprises cis-1,4-polybutadiene as a base rubber, a metal salt of an unsaturated carboxylic acid, a crosslinking agent, optionally a filler, and the like.

According to the present invention, the base rubber must be a cis-1,4-polybutadiene rubber. The cis-1,4-polybutadiene preferably has a cis-1,4-bond of not less than 40%, preferably not less than 80%. The cis-1,4-polybutadiene rubber may be mixed with natural rubber, polyisoprene rubber, styrene-butadiene rubber, ethylene-propylene-diene rubber (EPDM), and the like, if necessary.

The metal salt of an unsaturated carboxylic acid, which acts as a co-crosslinking agent, includes mono or divalent metal salts, such as zinc or magnesium salts of $\alpha$, $\beta$-unsaturated carboxylic acids having 3 to 8 carbon atoms (e.g. acrylic acid, methacrylic acid, etc.). Preferred is zinc acrylate because it imparts high rebound characteristics to the resulting golf ball. An amount of the metal salt of unsaturated carboxylic acid in the rubber composition is 30 to 40 parts by weight, based on 100 parts by weight of cis-1,4-polybutadiene. When the amount of the metal salt of unsaturated carboxylic acid is larger than 40 parts by weight, the core is too hard and shot feel is poor. On the other hand, when the amount of the metal salt of the unsaturated carboxylic acid is smaller than 30 parts by weight, the core is too soft and the rebound characteristics are degraded to reduce flight distance.

The crosslinking agents may be an organic peroxide such as dicumyl peroxide, t-butyl peroxide and the like. Preferred organic peroxide is dicumyl peroxide. An amount of the organic peroxide is preferably from 0.3 to 5.0 parts by weight, based on 100 parts by weight of cis-1,4-polybutadiene. When the amount of the organic peroxide is smaller than 0.3 parts by weight, the core is too soft and the rebound characteristics are degraded to reduce flight distance. On the other hand, when the amount of the organic peroxide is larger than 5.0 parts by weight, the core is too hard and shot feel is poor.

The filler, which can be used for the core of golf ball, includes for example, zinc oxide, barium sulfate, calcium carbonate and the like, and a mixture thereof. An amount of the filler is not limited and can vary depending on the specific gravity and size of the cover and core, but generally is from 5 to 50 parts by weight, based on 100 parts by weight of cis-1,4-polybutadiene. When the amount of the filler is smaller than 5 parts by weight, the core is too light. On the other hand, when the amount of the filler is larger than 50 parts by weight, the core is too heavy.

The rubber composition for the core of the present invention can contain other components which have been conventionally used for preparing the core of solid golf balls, such as an antioxidant or a peptizing agent. The core of the present invention may not only have a single-layer structure, but also may have a multi-layer structure of two or more layers.

In the present invention, it is preferable that the core 1 has a hardness distribution substantially linearly increasing from the center point to the surface of the core, and a JIS-C hardness difference between the center point and the surface 3 of the core of not less than 15. When the hardness difference is less than 15, shot feel of the resulting golf ball is too poor and the golf ball creates a high trajectory when hit by a driver or a long iron club, thus reducing the flight distance. A JIS-C hardness of the core surface 3 is preferably between 75 to 95, more preferably 80 to 92.

In the present invention, it is preferable that the core has a deformation amount of 2.3 to 3.2 mm, when applying from an initial load of 10 kgf to a final load of 130 kgf on the core. When the deformation amount is smaller than 2.3 mm, the core is too hard. Therefore, the shot feel of the resulting golf ball is degraded. On the other hand, when the deformation amount is larger than 3.2 mm, the core is too soft. Therefore, the rebound characteristics of the resulting golf ball are degraded to reduce flight distance.

A cover is provided on the core so that the JIS-C hardness difference between the core surface and the cover is adjusted to be not more than 10. When the hardness difference between the core surface and the cover is not more than 10, the hardness difference between the core and the cover is small. Therefore, the resulting golf ball has a suitable deformation amount when hitting, good a shot feel, a suitable launch angle (from 11.3 to 12.8°) and a suitable spin amount (from 2,200 to 2,900 rpm). The cover may be generally formed from an ionomer which is known to the art and has been used for the cover of solid golf balls, or may optionally contain other resins in a small amount.

The cover used in the present invention may optionally contain pigments (such as titanium dioxide, etc.), and the other additives such as an UV absorber, a photostabilizer and a fluorescent agent or a fluorescent brightener, etc., in addition to the resin component, as long as the addition of the additives does not deteriorate the desired performance of the golf ball cover the amount of the pigment is preferably from 0.1 to 0.5 parts by weight, based on 100 parts by weight of the cover resin.

The cover layer of the present invention is formed by a conventional method for forming a golf ball cover well known in the art, such as injection molding, pressure molding and the like.

In the present invention, the cover thus formed has a thickness of 1.0 to 2.1 mm, preferably 1.2 to 1.9 mm, and a JIS-C hardness of 75 to 95, preferably 80 to 92. When the thickness of the cover is smaller than 1.0 mm, the cover is too thin to exhibit the desired properties of the cover. On the other hand, when the thickness is larger than 2.1 mm, the cover is too thick to exhibit the desired properties of the core. When the JIS-C hardness of the cover is smaller than 75, the resulting golf ball is too soft. Therefore, the rebound characteristics are degraded which reduces flight distance. On the other hand, when the hardness is larger than 95, the resulting golf ball is too hard. Therefore, controllability on approach shots or shot feel are degraded. Further, the cover preferably has a flexural modulus of 800 to 1,800 kgf/cm². When the flexural modulus of the cover is smaller than 800 kgf/cm², the resulting golf ball is too soft. Therefore, the flight distance is reduced and the shot feel is degraded. On the other hand, when the flexural modulus is larger than 1,800 kgf/cm², the resulting golf ball is too hard. Therefore, controllability on approach shots or shot feel is degraded.

The cover used in the golf ball of the present invention has a JIS-C hardness of 75 to 95, which is smaller than that of conventional ionomer covers (about 100). If the cover is made soft, the rebound characteristics of the resulting golf ball are generally degraded. However, according to the present invention, the thickness of the cover is reduced to the range of 1.0 to 2.1 mm (conventional cover thickness being from about 2.0 to 2.3 mm) in order to restrain the rebound characteristics from degrading and to improve shot feel. In the conventional golf balls, a hardness difference between the core surface and the cover was not less than 15 (core surface hardness being 70 to 85). In the present invention, the surface hardness of the core increases and the cover is made thin and soft, so that the hardness difference between the cover and the core surface is adjusted to not more 10 by JIS-C hardness.

When forming a cover on the core, many depressions called "dimples" are generally formed on the surface of the golf ball. The dimples are preferably comprised of two or more types, and are present 330 to 450 in number. If the number of dimples is outside of the above range, the resulting golf ball does not create a parabolic trajectory when hitting to reduce flight distance. In the golf ball of the present invention, paint finishing or a marking stamp may be optionally provided on the surface after cover forming for commercial purposes.

EXAMPLES

The following Examples and Comparative Examples further illustrate the present invention in detail but are not to be construed as limiting the scope thereof.

Production of cores

Each spherical solid core was prepared by mixing the ingredients for core described in Tables 1 to 2 and press-molding the mixture at the molding condition described therein.

A JIS-C hardness distribution from the center point to the surface of the resulting core was determined, and the results are shown in Tables 1 to 2. Diameter and deformation amount, when applying from an initial load of 10 kgf to a final load of 130 kgf, were determined, and the results are shown in Tables 1 to 2. The test methods are as follows.

TABLE 1

| Kind | I | II | III |
|---|---|---|---|
| Ingredients | | | |
| Butadiene rubber *1 | 100 | 100 | 100 |
| Zinc acrylate | 34 | 34 | 34 |
| Zinc oxide | 18 | 16 | 14 |
| Antioxidant *2 | 0.5 | 0.5 | 0.5 |
| Dicumyl peroxide | 1.2 | 1.2 | 1.2 |
| Molding condition | 156 × 20 | 156 × 20 | 156 × 20 |
| (° C. × minutes) | +170 × 8 | +170 × 8 | +170 × 8 |
| Diameter (mm) | 38.2 | 39.0 | 39.6 |
| Deformation amount (mm) | 2.4 | 2.6 | 2.8 |
| Hardness distribution | | | |
| Center point | 65 | 65 | 65 |
| 5 mm from the center point | 75 | 75 | 74 |
| 10 mm from the center point | 78 | 79 | 80 |
| 15 mm from the center point | 84 | 86 | 85 |
| Surface | 88 | 88 | 90 |

TABLE 2

| Kind | IV | V | VI |
|---|---|---|---|
| Ingredients | | | |
| Butadiene rubber *1 | 100 | 100 | 100 |
| Zinc acrylate | 34 | 25 | 34 |
| Zinc oxide | 16 | 20 | 9 |
| Antioxidant *2 | 0.5 | 0.5 | 0.5 |
| Dicumyl peroxide | 1.2 | 1.2 | 1.4 |
| Molding condition (° C. × minutes) | 140 × 40 | 156 × 20 +170 × 8 | 156 × 20 +170 × 8 |
| Diameter (mm) | 39.0 | 39.0 | 40.2 |
| Deformation amount (mm) | 2.2 | 3.5 | 2.7 |
| Hardness distribution | | | |
| Center point | 79 | 65 | 65 |
| 5 mm from the center point | 79 | 73 | 70 |
| 10 mm from the center point | 79 | 76 | 79 |
| 15 mm from the center point | 79 | 80 | 86 |
| Surface | 70 | 78 | 91 |

*1: High-cis polybutadiene (trade name "BR-18") from Japan Synthetic Rubber Co., Ltd.
*2: Antioxidant (trade name "Yoshinox 425") from Yoshitomi Pharmaceutical Inds., Ltd.

Examples 1 to 4 and Comparative Examples 1 to 5

A cover layer was formed by injection molding the cover ingredients described in Table 3 on the resulting cores I to V. Then, a paint was applied on the cover layer to produce each solid golf ball.

TABLE 3

| Ingredients | A | B | C | D |
|---|---|---|---|---|
| Hi-milan 1605 *3 | — | 5 | 25 | 50 |
| Hi-milan 1706 *4 | — | — | 25 | 50 |
| Hi-milan 1555 *5 | 5 | 10 | — | — |
| Hi-milan 1855 *6 | 95 | 85 | 50 | — |
| Titanium dioxide | 2 | 2 | 2 | 2 |
| JIS-C hardness | 83 | 87 | 97 | — *7 |
| Shore D hardness | (56) | (59) | (66) | (69) |
| Flexural modulus (kgf/cm²) | 1000 | 1300 | 2500 | 3500 |

*3: Hi-milan 1605 (trade name), ethylene-methacrylic acid copolymer ionomer resin obtained by neutralizing with sodium ion, manufactured by Mitsui Du Pont Polychemical Co., Ltd.
*4: Hi-milan 1706 (trade name), ethylene-methacrylic acid copolymer ionomer resin obtained by neutralizing with zinc ion, manufactured by Mitsui Du Pont Polychemical Co., Ltd.
*5: Hi-milan 1555 (trade name), ethylene-methacrylic acid copolymer ionomer resin obtained by neutralizing with sodium ion, manufactured by Mitsui Du Pont Polychemical Co., Ltd.
*6: Hi-milan 1855 (trade name), ethylene-butyl acrylate-methacrylic acid terpolymer ionomer resin obtained by neutralizing with zinc ion, manufactured by Mitsui Du Pont Polychemical Co., Ltd.
*7: It is not measurable because the hardness is more than 100.

| Kind | Hardness JIS-C* | Hardness Shore D** | Flexural modulus*** (kgf/cm²) |
|---|---|---|---|
| Hi-milan 1605 | 97 | 67 | 3700 |
| Hi-milan 1706 | 96 | 66 | 3300 |
| Hi-milan 1555 | 91 | 62 | 2500 |
| Hi-milan 1855 | 83 | 56 | 900 |

*JIS K 6301
**ASTM D-2240
***ASTM D-709A

For the resulting golf balls, flight performance (launch angle, spin amount and carry) when hitting by a driver (a No. 1 wood club), controllability at approach shot and shot feel were measured or evaluated, and the results are shown in Tables 4 to 6. The test methods are as follows.

Test method (1) Flight performance

After a driver was mounted to a swing robot manufactured by True Temper Co. and a golf ball was hit at a head speed of 45 m/second, the launch angle, spin amount and flight distance were measured. The spin amount was measured by continuously taking a photograph of a mark provided on the hit golf ball using a high-speed camera. As the flight distances, a carry which was a distance to the dropping point of the hit golf ball was measured.

(2) Controllability

The controllability at approach shot (40 yards) of the golf ball was evaluated by 10 professional golfers according to a practical hitting test using a sand wedge. The evaluation criteria are as follows.

Evaluation Criteria

◯: Not less than 8 out of 10 golfers felt that the golf ball is easily controlled.

Δ: From 4 to 7 out of 10 golfers felt that the golf ball is easily controlled.

x: Not more than 3 out of 10 golfers felt that the golf ball is easily controlled.

(2) Shot feel

The shot feel of the golf ball is evaluated by 10 professional golfers according to a practical hitting test using a driver(a No. 1 wood club). The evaluation criteria are as follows.

Evaluation Criteria

◯: Not less than 8 out of 10 golfers felt that the golf ball has good shot feel.

Δ: From 4 to 7 out of 10 golfers felt that the golf ball has good shot feel.

x: Not more than 3 out of 10 golfers felt that the golf ball has good shot feel.

TABLE 4

| Example No. | 1 | 2 | 3 | 4 |
|---|---|---|---|---|
| Core formulation | II | II | III | VI |
| Cover formulation | A | B | B | B |
| Diameter of golf ball (mm) | 42.7 | 42.7 | 42.7 | 42.7 |
| Weight of golf ball (g) | 45.4 | 45.4 | 45.4 | 45.4 |
| Flight performance (W #1) | | | | |
| Launch angle (°) | 11.8 | 12.0 | 12.3 | 12.5 |
| Spin amount (rpm) | 2700 | 2600 | 2500 | 2400 |
| Flight distance (yard) | 254 | 255 | 256 | 257 |
| Controllability at approach shot (40 yards) | ◯ | ◯ | ◯ | |
| Shot feel | ◯ | ◯ | ◯ | ◯ |

TABLE 5

| Comparative example No. | 1 | 2 | 3 |
|---|---|---|---|
| Core formulation | I | IV | V |
| Cover formulation | B | B | B |
| Diameter of golf ball (mm) | 42.7 | 42.7 | 42.7 |
| Weight of golf ball (g) | 45.4 | 45.4 | 45.4 |
| Flight performance (W #1) | | | |
| Launch angle (°) | 11.2 | 11.0 | 11.8 |
| Spin amount (rpm) | 3000 | 3100 | 2500 |

TABLE 5-continued

| Comparative example No. | 1 | 2 | 3 |
|---|---|---|---|
| Flight distance (yard) | 250 | 251 | 248 |
| Controllability at approach shot (40 yards) | ○ | ○ | ○ |
| Shot feel | ○ | x | Δ |

TABLE 6

| Comparative example No. | 4 | 5 |
|---|---|---|
| Core formulation | II | II |
| Cover formulation | C | D |
| Diameter of golf ball (mm) | 42.7 | 42.7 |
| Weight of golf ball (g) | 45.4 | 45.4 |
| Flight performance (W #1) | | |
| Launch angle (°) | 12.4 | 12.5 |
| Spin amount (rpm) | 2300 | 1900 |
| Flight distance (yard) | 255 | 255 |
| Controllability at approach shot (40 yards) | x | x |
| Shot feel | x | x |

As is apparent from Table 4 to Table 6, the golf balls of Examples 1 to 4 showed excellent flight performance when hit by a driver and good controllability at approach shot (40 yards), and good shot feel.

What is claimed is:

1. A solid golf ball comprising a core and a cover formed on the core, wherein the cover has a thickness of 1.0 to 2.1 mm, a JIS-C hardness of 75 to 95, and a flexural modulus of about 800 to 1,800 kgf/cm$^2$, the core is formed from a rubber composition containing 100 parts by weight of cis-1,4-polybutadiene rubber and 30 to 40 parts by weight of a metal salt of an unsaturated carboxylic acid, and the JIS-C hardness difference between the surface of the core and the cover is not more than 10.

2. The solid golf ball according to claim 1, wherein the core has a hardness distribution substantially linearly increasing from the center point to the surface of the core, the JIS-C hardness difference between the center point and the surface of the core being not less than 15, and having a deformation amount of 2.3 to 3.2 mm, when applying from an initial load of 10 kgf to a final load of 130 kgf on the core.

3. The solid golf ball according to claim 1, wherein the cover has a flexural modulus of 800 to 1,800 kgf/cm$^2$.

4. The solid golf ball of claim 1, wherein the cis-1,4-polybutadiene is present in an amount of not less than 40%.

* * * * *